(12) United States Patent
Zhao et al.

(10) Patent No.: US 11,994,304 B2
(45) Date of Patent: May 28, 2024

(54) SOLAR PHASE-CHANGE ENERGY STORAGE HEATING VENTILATION PARTITION WALL AND MODULAR HEATING SYSTEM THEREOF

(71) Applicant: TIANJIN UNIVERSITY, Tianjin (CN)

(72) Inventors: Jing Zhao, Tianjin (CN); Dehan Liu, Tianjin (CN); Shilei Lyu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/039,671

(22) PCT Filed: Sep. 28, 2022

(86) PCT No.: PCT/CN2022/121980
§ 371 (c)(1),
(2) Date: May 31, 2023

(87) PCT Pub. No.: WO2023/051567
PCT Pub. Date: Apr. 6, 2023

(65) Prior Publication Data
US 2023/0417425 A1    Dec. 28, 2023

(30) Foreign Application Priority Data
Sep. 29, 2021    (CN) .......................... 202111152843.X

(51) Int. Cl.
*F24D 5/00* (2022.01)
*F24D 5/10* (2006.01)
(Continued)

(52) U.S. Cl.
CPC ............... *F24D 5/005* (2013.01); *F24D 5/10* (2013.01); *F24D 11/007* (2013.01); *F24S 60/10* (2018.05)

(58) Field of Classification Search
CPC .......... F24D 5/005; F24D 11/007; F24S 60/10
See application file for complete search history.

(56) References Cited

U.S. PATENT DOCUMENTS

| 4,258,696 A * | 3/1981 | Gopal | F28D 20/028 165/104.11 |
| 4,282,752 A * | 8/1981 | Currie | G01K 1/026 374/173 |
| 2021/0270470 A1* | 9/2021 | Plinke | F24S 60/30 |

FOREIGN PATENT DOCUMENTS

| CN | 201093907 Y | 7/2008 |
| CN | 104145747 A | 11/2014 |
| (Continued) | | |

OTHER PUBLICATIONS

International Search Report of PCT/CN2022/121980.
Written Opinion of PCT/CN2022/121980.

*Primary Examiner* — Jorge A Pereiro

(57) ABSTRACT

A solar phase-change energy storage heating ventilation partition wall and modular heating system thereof, the partition wall consists of a solid partition wall (1), a thermal insulation layer (2), a decoration layer (3), frame of steel reinforcement (4), reflecting layers (5) and phase-change heat storage modules (6), the modular heating system comprises a solar air collector (13), phase-change heat storage units (23) arranged modularly, and a partition wall, to achieve energy storage and heating. Compared with the prior art, the modular heat storage partition wall components are simple in manufacturing process and flexible in assembly, and can be freely arranged and combined according to actual conditions; the system collects solar energy by the solar air collector during the daytime and stores the heat in the phase-change heat storage modules in the partition wall; and the heat storage partition wall can provide heat for the room in a radiation manner.

3 Claims, 3 Drawing Sheets

(51) Int. Cl.
*F24D 11/00* (2022.01)
*F24S 60/10* (2018.01)

(56) References Cited

FOREIGN PATENT DOCUMENTS

| CN | 104674979 | A | 6/2015 |
| CN | 104746647 | A | 7/2015 |
| CN | 110595244 | A | 12/2019 |
| JP | 2714047 | B2 | 2/1998 |

\* cited by examiner

SOLAR PHASE-CHANGE ENERGY STORAGE HEATING VENTILATION PARTITION WALL AND MODULAR HEATING SYSTEM THEREOF

CROSS-REFERENCE TO RELATED APPLICATIONS

This Application is a national stage application of PCT/CN2022/121980. This application claims priorities from PCT Application No. PCT/CN2022/121980, filed Sep. 28, 2022, and from the Chinese patent application 202111152843.X filed Sep. 29, 2021, the content of which are incorporated herein in the entirety by reference.

TECHNICAL FIELD

The present disclosure relates to the field of novel building wall structures, in particular to a heating ventilation partition wall and a heating system in which a solar energy storage technology is used.

BACKGROUND ART

At present, buildings energy consumption is high in China, and especially heating in winter consumes a large amount of primary energy. Thus, it is urgent to apply clean energy in a building heating process to promote development of green low-carbon buildings. Solar energy, as the most common renewable green energy, is applied in a heating system as a heat source, which can properly reduce the energy consumption of buildings and decrease carbon emission caused by heating of the buildings.

Most traditional solar heating technologies directly utilize solar radiation or store heat in building envelopes temporarily, and have defects of large fluctuation, low stability and incapability of achieving continuous heating. With the development of phase change energy storage technologies, phase change materials are fused into building components to properly solve the problem of mismatches between supply and demand of solar heating over time, and stabilize room temperature.

Chinese patent 202010383587.4 disclosed an interlayer ventilation type phase change heat storage structure and a laying method thereof, and provided an interlayer structure consisting of a phase change heat storage bag based on macro packaging; the heat storage or release rate of phase change materials is increased by air channels, and the thermal insulation performance of building envelopes is improved; and solutions are provided for solar heating in winter and radiant cooling in summer for buildings. However, the phase change heat storage structure in the present disclosure provides heating or cooling for rooms in a radiation manner mainly, which has low heat exchange efficiency and easily results in waste of a heat storage capacity. The phase change materials are packaged in a nylon thin bag, and the heat storage structure is bonded by glue. This results in a complicated process, high construction difficulty, and difficulty in promotion and application.

SUMMARY

In order to overcome the shortcomings in the prior art, the present disclosure provides a modular solar phase-change energy storage heating ventilation partition wall and a modular heating system, and achieves a solar phase change energy storage heating and ventilation partition wall, and the phase change heat storage modules are connected to a solar air collector.

In order to solve the above technical problems, the present disclosure provides the following technical scheme:

A solar phase-change energy storage heating ventilation partition wall consists of a solid partition wall, a thermal insulation layer, a decoration layer, frame of steel reinforcement, reflecting layers and phase-change heat storage modules, wherein an internal air channel is further arranged in each of the phase-change heat storage modules; the phase-change heat storage modules are fixedly installed on the frame of steel reinforcement; tooth profile structures are arranged on both tops and bottoms of the phase-change heat storage modules; and ribs for enhancing heat transfer are arranged on inner walls of the phase-change heat storage modules.

The phase-change heat storage modules are hollow cylinders, hollow semi-cylinders or annular hollow cylinders.

Each phase-change heat storage module is made of stainless steel by welding, and internally filled with phase-change materials, and a phase-change temperature is between 20° C. and 25° C.

A modular heating system using the solar phase-change energy storage heating ventilation partition wall includes a solar air collector and phase-change heat storage units arranged modularly to achieve energy storage and heating; each phase-change heat storage unit includes a plurality of phase-change heat storage subunits, and each phase-change heat storage subunit consists of a plurality of meshed phase-change heat storage modules; the phase-change heat storage subunits are connected in parallel; wherein:

a top and a bottom of each of the phase-change heat storage units are connected with a fourth air valve, a fifth air valve, a sixth air valve, a seventh air valve, an eighth air valve, a ninth air valve, a tenth air valve and an eleventh air valve to form an air inlet at the top and a ventilation port at the bottom of each of the phase-change heat storage units respectively;

the phase-change heat storage units are connected with a return air inlet of the solar air collector through a third air valve, and connected with an air outlet of the solar air collector through an axial flow fan and a second air valve; hot air in the solar air collector enters the phase-change heat storage units from the tops thereof and return from the bottoms thereof;

a first air valve arranged on a bypass line is located between the second air valve and the axial flow fan, and hot air in air ducts is communicated with indoor air by opening the first air valve.

Customized three-way or four-way valves are sealing connected with reserved connectors on the tops and bottoms of the phase-change heat storage modules, and internal air channels are connected with other phase-change heat storage units by the air ducts in parallel. The air ducts after parallel connection are connected to the solar air collector.

The system has three working conditions of daytime energy storage, natural convection heat transfer and heat release by forced ventilation:

daytime energy storage: when weather conditions are good during the daytime, air in the solar air collector warms up, the second air valve and the third air valve are opened, and the fourth air valve, the fifth air valve, the sixth air valve, the seventh air valve, the eighth air valve, the ninth air valve, the tenth air valve, the eleventh air valve and the first air valve are closed; the axial flow fan is turned on; the high-temperature air in the solar air collector is compressed by the axial flow fan to store energy and provide heat for the phase-change heat storage modules in the solid partition wall, and low-temperature air after heat exchange returns to the solar air collector from the bottoms of the phase-change heat storage units for circulation;

natural convection heat transfer: when the indoor air temperature begins to drop at night, the first air valve, the second air valve and the third air valve are closed, the fourth air valve, the fifth air valve, the sixth air valve, the seventh air valve, the eighth air valve, the ninth air valve, the tenth air valve and the eleventh air valve are opened, and the axial flow fan is turned off, and at this moment, air in the internal channels of the phase-change heat storage units in the solid partition wall is heated to rise naturally, and indoor cold air enters the phase-change heat storage units through the ventilation ports at the bottoms of phase-change heat storage units in the solid partition wall to heat the room through natural convection; and heat release by forced ventilation: when the heat provided for the room through natural convection is limited, the fourth air valve, the fifth air valve, the sixth air valve, the seventh air valve, the second air valve and the third air valve are closed, and the eighth air valve, the ninth air valve, the tenth air valve, the eleventh air valve are opened; the first air valve and the axial flow fan is turned on, and therefore the room is heated by the high-temperature air in the phase-change heat storage units in the solid partition wall through the ventilation ports at the bottoms of the phase-change heat storage units; and cold air at the top of the room is fed into the phase-change heat storage units in the solid partition wall to be heated and forcibly cycled for heating the room.

Compared with the prior art, the present disclosure has the following advantages:

1. the modular heat storage partition wall components are simple in manufacturing process and flexible in assembly, and can be freely arranged and combined according to actual conditions;
2. the system collects solar energy by the solar air collector during the daytime and stores the heat in the phase-change heat storage modules in the partition wall; and meanwhile, high-temperature flowing air can provide heat for the room by the heat storage partition wall in a radiation manner so as to improve the comfort of the room;
3. the heat stored in the phase-change heat storage modules is provided for the room by natural convection or forced air supply, which can rapidly increase the indoor air temperature, and the heat utilization rate of heat in the phase-change heat storage modules is increased;
4. the aesthetic property is improved while the thermal insulation and heat storage performance is enhanced, and the occupation rate of indoor space is reduced.

Reference signs: 1. solid partition wall, 2. thermal insulation layer, 3. decoration layer, 4. steel bar skeleton, 5. reflecting layer, 6. phase-change heat storage module, 7. internal air channel, 8. tooth profile structure, 9. rib, 10. axial flow fan, 11. first air valve, 12. second air valve, 13. solar air collector, 14. third air valve, 15. fourth air valve, 16. fifth air valve, 17. sixth air valve, 18. seventh air valve, 19. eighth air valve, 20. ninth air valve, 21. tenth air valve, 22. eleventh air valve, 23. phase-change heat storage unit, and 231. phase-change heat storage subunit.

DETAILED DESCRIPTION OF THE PRESENT DISCLOSURE

The technical scheme of the present disclosure will be described below in detail with reference to accompanying drawings and specific embodiments.

Figure 1:
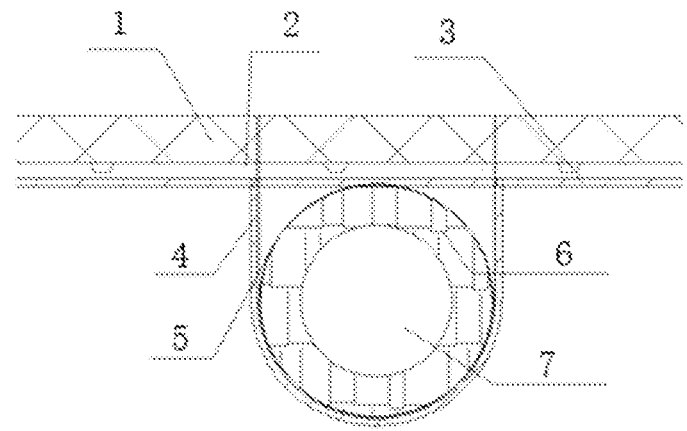
FIG. 1 is a structural sectional view of a solar phase-change energy storage heating ventilation partition wall according to the present disclosure.

FIG. 1 is a structural sectional view of a solar phase-change energy storage heating and ventilation partition wall provided by the present disclosure. The partition wall consists of a solid partition wall 1, a thermal insulation layer 2, a decoration layer 3, frame of steel reinforcement 4, reflecting layers 5 and phase-change heat storage modules 6. Wherein, an internal air channel 7 is further arranged in each of the phase-change heat storage modules. Each phase-change heat storage module is made of stainless steel by welding, and internally filled with phase-change materials, and a phase-change temperature thereof is between 20° C. and 25° C., which is beneficial for maintaining the stability of indoor temperature during the day and heat release at night, to achieve the purpose of peak load shaving. The frame of steel reinforcement 4 plays a role in confining and supporting the phase-change heat storage modules, thereby facilitating installation and fixation of the phase-change heat storage modules.

Figure 2:
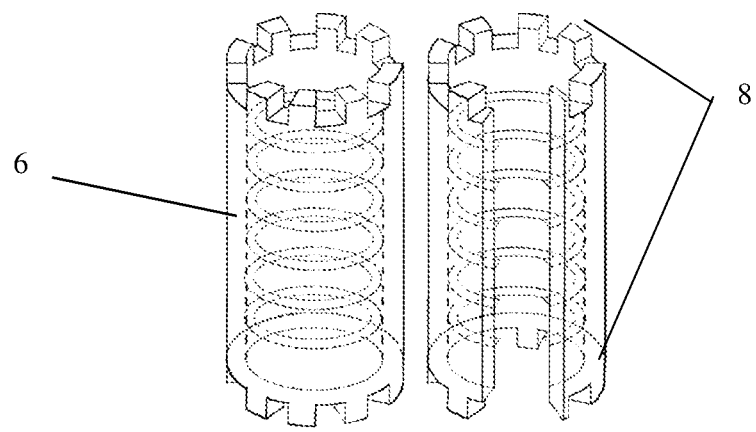
FIG. 2 is a structural sectional view of a hollow cylindrical phase-change heat storage module in Embodiment 1.
Figure 3:
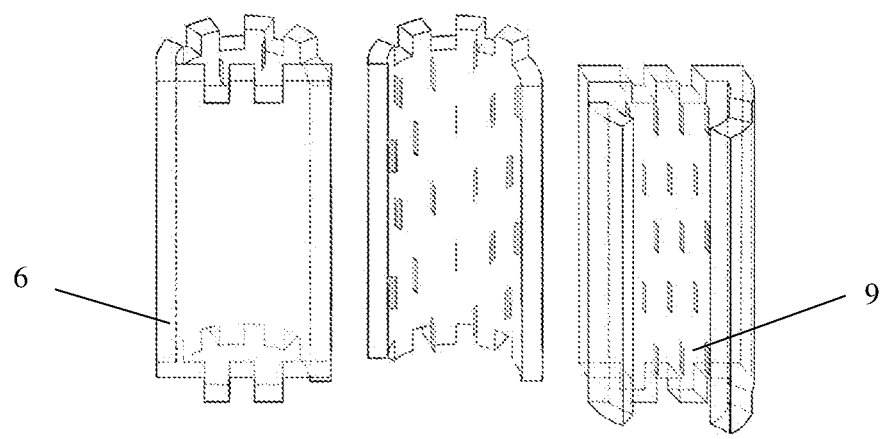
FIG. 3 is a sectional view of a hollow semi-cylindrical phase-change heat storage module in Embodiment 2.
Figure 4:
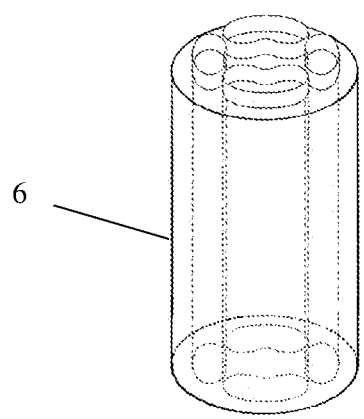
FIG. 4 is a sectional view of an annular hollow cylindrical phase-change heat storage module in Embodiment 3.

As shown in FIGS. 2, 3 and 4, the phase-change heat storage modules 6 are hollow cylinders in Embodiment 1, hollow semi-cylinders in Embodiment 2 or annular hollow cylinders in Embodiment 3. A top and a bottom of each of the modules are of tooth profile structures 8 to facilitate a meshing connection between the upper and lower phase-change heat storage modules. The ribs 9 for enhancing heat transfer are additionally arranged on inner wall surfaces of the modules. The phase-change heat storage modules are formed by welding stainless steel plates and the ribs, which improve the efficiency of heat exchange with air; and a packaging process of the phase-change materials is simplified, and the materials are properly sealed, and are not liable to leak.

FIG. 2 is a structural sectional view of a hollow cylindrical phase-change heat storage module in Embodiment 1 of the present disclosure. The tooth profile structures are formed on the top and bottom of each of the hollow cylindrical phase-change heat storage modules, which facilitate meshing and splicing among the phase-change heat storage modules during construction. The ribs are installed on inner surfaces of the phase-change heat storage modules to enhance the effect of heat exchange between the phase-change heat storage modules and the air. In order to ensure the airtightness and heat exchange efficiency of the phase-change heat storage modules, surfaces of the phase-change heat storage modules are formed by welding stainless steel. Firstly, the stainless steel is cut according to required shapes for the surfaces of the modules; then, the ribs playing a role in heat exchange are evenly welded on rectangular steel plates of internal cylinders transversely; next, the internal cylinders and external cylinders of the phase-change heat storage modules are welded, and ring-shaped steel plates on bottom surfaces of the modules are connected with the internal cylinders and the external cylinders by welding; then, molten phase-change materials with a phase-change range of 20° C.-25° C. are filled into the modules through the openings at the tops of the modules; and after the modules are filled with the phase-change materials completely, the tops of the modules are sealed by welding to complete construction of the phase-change heat storage modules.

FIG. 3 is a sectional view of a hollow semi-cylindrical phase-change heat storage module in Embodiment 2 of the present disclosure. The hollow semi-cylindrical phase-change heat storage module is different from the hollow cylindrical phase-change heat storage module in that the side of the hollow semi-cylindrical phase-change heat storage module is a plane to facilitate construction and installation of the partition wall in a small space. In order to enhance the effect of heat exchange between the phase-change heat storage modules and air, longitudinal ribs are evenly welded on the inner surfaces of the modules. Similar to the hollow cylindrical phase-change heat storage module, the hollow semi-cylindrical phase-change heat storage module is provided with tooth profile structures on its top and bottom, which facilitate meshing and splicing among the phase-change heat storage modules during construction. The construction and packaging processes of the hollow semi-cylindrical phase-change heat storage module are consistent with those of the hollow cylindrical phase-change heat storage module.

FIG. 4 is a sectional view of an annular hollow cylindrical phase-change heat storage module in Embodiment 3 of the present disclosure. The annular hollow cylindrical phase-change heat storage module is different from the hollow cylindrical phase-change heat storage module in that the interior of the annular hollow cylindrical phase-change heat storage module is not completely hollow, but is internally provided with an annular vent, and the heat storage capacity thereof is higher than that of the hollow cylindrical heat storage module. In order to facilitate a combination among different annular hollow cylindrical phase-change heat storage modules, connectors are additionally welded on tops of the internal air channels thereof, to facilitate a combination of the phase-change heat storage modules via splicing during construction. The specific construction and packaging processes thereof are consistent with those of the hollow cylindrical phase-change heat storage module.

Figure 5:
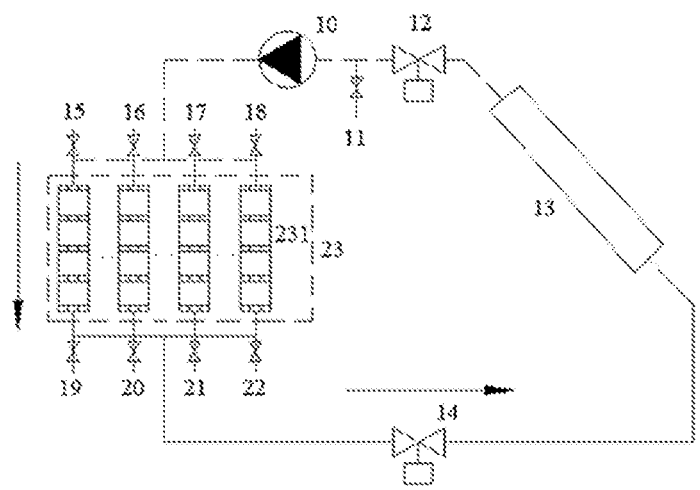
FIG. 5 is a schematic diagram of an overall structure of a modular heating system of a solar phase-change energy storage heating ventilation partition wall according to the present disclosure.

FIG. 5 is a schematic diagram of an overall structure of a modular heating system of a solar phase-change energy storage heating and ventilation partition wall according to the present disclosure. The system mainly includes phase-change heat storage units, air ducts and a solar air collector. The energy storage and heating of the system in winter are achieved through a connection between the air ducts and the solar air collector, which are specifically described as follows:

the tops and bottoms of the modular phase-change heat storage units 23 are correspondingly connected with a fourth air valve 15, a fifth air valve 16, a sixth air valve 17, a seventh air valve 18, an eighth air valve 19, a ninth air valve 20, a tenth air valve 21 and an eleventh air valve 22, that is, air ports at the bottoms (tops) of the air valves are connected with the phase-change heat storage modules, and communicated with indoor air; left and right air ports are connected with air ducts distributed among the fourth air valve 15, the fifth air valve 16, the sixth air valve 17, the seventh air valve 18, the eighth air valve 19, the ninth air valve 20, the tenth air valve 21 and the eleventh air valve 22; and each phase-change heat storage unit 23 includes a plurality of phase-change heat storage subunits 231, and each phase-change heat storage subunit 231 consists of a plurality of meshed phase-change heat storage modules. The phase-change heat storage subunits 231 are in parallel connection. The phase-change heat storage units 23 are connected with a return air inlet of the solar air collector 13 through the third air valve 14 and the air ducts thereof, and connected with an air outlet of the solar air collector through an axial flow fan 10 and the second air valve 12. A bypass line arranged between the second air valve 12 and the axial flow fan 10 is communicated with indoor air through the first air valve 11. Hot air in the solar air collector 13 is compressed by the axial flow fan 10 after passing through the second air valve 12, and enters the phase-change heat storage modules 6 from the tops thereof, and the return air at the bottoms returns to the solar air collector 13 through the third air valve 14. Main pipes where the axial flow fan 10 and the second air valve 12 are located are intake air ducts, and a main pipe where the third air valve 14 is located is a return air duct.

The specific embodiment of the present disclosure is described as follows:

The solar phase-change energy storage heating ventilation partition wall according to the present disclosure is arranged in a room, and a plurality of phase-change heat storage units are arranged in the partition wall, wherein each phase-change heat storage unit is formed by splicing a plurality of phase-change heat storage modules. In order to adapt to different ventilation forms of varying regions and improve the efficiency of heat exchange between the phase-change heat storage modules and air, the specific structures of the phase-change heat storage modules are different, including hollow cylindrical phase-change heat storage modules, hollow semi-cylindrical phase-change heat storage modules and annular hollow cylindrical phase-change heat storage modules. The phase-change heat storage modules are spliced through the connectors on the tops thereof and the connectors at the bottoms of other phase-change heat storage modules with identical structures to achieve internal ventilation of the phase-change heat storage units.

The phase-change heat storage units are fixedly combined with the partition wall by the splicing of the prefabricated frame of steel reinforcement. Firstly, the thermal insulation layer 2 is laid on the solid partition wall 1 to enhance the thermal insulation effect of the partition wall and reduce heat exchange between the phase-change heat storage units and outside. The frame of steel reinforcement is driven into the wall body by using expansion screws, and the frame of steel reinforcement 4 for improving the support effect is additionally reserved at the bottoms and tops of the phase-change heat storage modules. Flexible steel wire ropes for improving the binding effect are arranged on the outer sides of the phase-change heat storage units, and the width of the frame of steel reinforcement is larger than the outer diameter of the phase-change heat storage modules, which facilitates installation of the phase-change heat storage units. The reflecting layer 5 is additionally arranged between the phase-change heat storage units and steel bars, to reduce external thermal radiation of the phase-change heat storage units. The phase-change heat storage units and the frame of steel reinforcement are fixed to the decoration layer 3. The customized three-way or four-way valves are sealing connected with the reserved connectors on the tops and bottoms of the phase-change heat storage modules 6. The internal air channels 7 are connected with other phase-change heat storage units by air ducts in parallel, and the air ducts after parallel connection are connected to the solar air collector.

Figure 6:
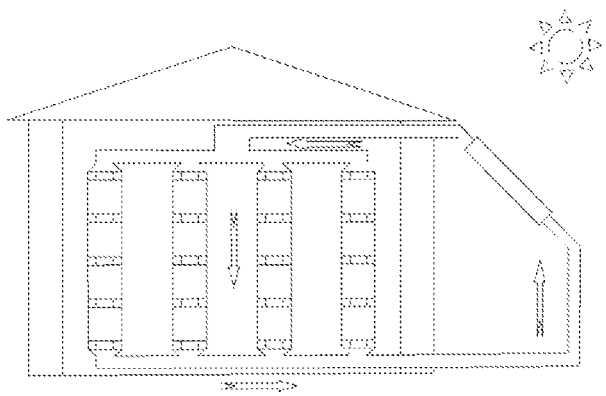
FIG. 6 is a schematic diagram of an overall structure of a partition wall during daytime operating conditions.
Figure 7:
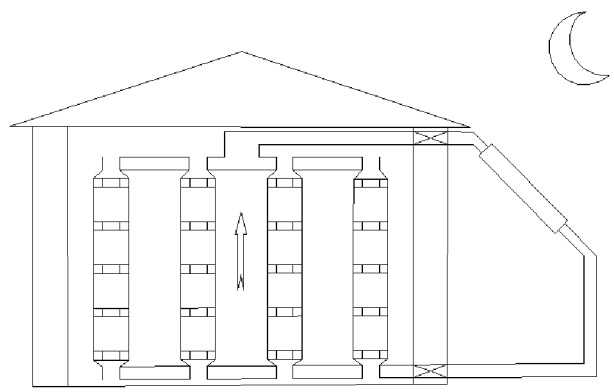
FIG. 7 is a schematic diagram of an overall structure of a partition wall during nighttime operating conditions.

The working process of the system in the present disclosure is shown as follows:

daytime energy storage: as shown in FIG. 6, when weather conditions are good during daytime, air in the solar air collector 13 warms up, the second air valve 12 and the third air valve 14 are opened, and the fourth air valve 15, the fifth air valve 16, the sixth air valve 17, the seventh air valve 18, the eighth air valve 19, the ninth air valve 20, the tenth air valve 21, the eleventh air valve 22 and the first air valve 11 are closed (to ensure that hot air in the air ducts are not communicated with indoor air); the axial flow fan 10 is turned on, and the high-temperature air in the solar air collector 13 is compressed by the axial flow fan 10 to store energy and provide heat for the phase-change heat storage modules 6 in the solid partition wall 1; and low-temperature air after heat exchange returns to the solar air collector 13 from the bottoms of the phase-change heat storage units 23 for circulation;

natural convection heat transfer: as shown in FIG. 7, when the indoor air temperature begins to drop at night, the first air valve 11, the second air valve 12 and the third air valve 14 are closed; the fourth air valve 15, the fifth air valve 16, the sixth air valve 17, the seventh air valve 18, the eighth air valve 19, the ninth air valve 20, the tenth air valve 21 and the eleventh air valve 22 are opened, and the axial flow fan 10 is turned off; at this moment, air in the internal ducts of the phase-change heat storage units in the solid partition wall 1 is heated to rise naturally, and the indoor cold air enters the phase-change heat storage units through the ventilation ports at the bottoms thereof for heating the room through natural convection; and heat release by forced ventilation: when the heat provided for the room through natural convection is limited, the fourth air valve 15, the fifth air valve 16, the sixth air valve 17, the seventh air valve 18, the second air valve 12 and the third air valve 14 are closed, and the eighth air valve 19, the ninth air valve 20, the tenth air valve 21, the eleventh air valve 22 and the first air valve 11 are opened; the axial flow fan 10 is turned on, and therefore the room is heated by the high-temperature air in the phase-change heat storage units 23 in the solid partition wall 1 through the ventilation ports of the phase-change heat storage units; and cold air at the top of the room is fed into the phase-change heat storage units in the solid partition wall 1 to be heated and forcibly cycled for heating the room.

The invention claimed is:

1. A modular heating system of a solar phase-change energy storage heating ventilation partition wall, comprising a solar air collector (13), phase-change heat storage units (23) arranged modularly, and a partition wall, to achieve energy storage and heating, and the partition wall consisting of a solid partition wall (1), a thermal insulation layer (2), a decoration layer (3), frame of steel reinforcement (4), reflecting layers (5) and phase-change heat storage modules (6), wherein an internal air channel (7) is further arranged in each of the phase-change heat storage modules (6); the phase-change heat storage modules (6) are fixedly installed on the frame of steel reinforcement (4), and each phase-change heat storage unit (23) comprises a plurality of phase-change heat storage subunits (231); each phase-change heat storage subunit (231) consists of a plurality of meshed phase-change heat storage modules, and the phase-change heat storage subunits (231) are connected in parallel; wherein:

a top and a bottom of each of the phase-change heat storage units (23) are correspondingly connected with a fourth air valve (15), a fifth air valve (16), a sixth air valve (17), a seventh air valve (18), an eighth air valve (19), a ninth air valve (20), a tenth air valve (21) and an eleventh air valve (22) to form an air inlet at the top and a ventilation port at the bottom of each of the phase-change heat storage units respectively;

the phase-change heat storage units (23) are connected with a return air inlet of the solar air collector (13) through the third air valve (14), and connected with an air outlet of the solar air collector (13) through an axial flow fan (10) and a second air valve (12); hot air in the solar air collector (13) enters the phase-change heat storage units (23) from the tops thereof and return from the bottoms thereof;

a first air valve (11) arranged on a bypass line is located between the second air valve (12) and the axial flow fan (10), and hot air in air ducts is communicated with indoor air by opening the first air valve (11);

customized three-way or four-way valves are sealing connected with reserved connectors on tops and bottoms of the phase-change heat storage modules (6), the internal air channels (7) are connected with other phase-change heat storage units by the air ducts in parallel, and the air ducts after parallel connection are connected to the solar air collector;

the system has three working conditions of daytime energy storage, natural convection heat transfer and heat release by forced ventilation:

daytime energy storage: when weather conditions are good during the daytime, air in the solar air collector warms up, the second air valve and the third air valve are opened, and the fourth air valve, the fifth air valve, the sixth air valve, the seventh air valve, the eighth air valve, the ninth air valve, the tenth air valve, the eleventh air valve and the first air valve are closed; the axial flow fan is turned on; the high-temperature air in the solar air collector is compressed by the axial flow fan to store energy and provide heat for the phase-change heat storage modules in the solid partition wall; low-temperature air after heat exchange returns to the solar air collector from the bottoms of the phase-change heat storage units for circulation;

natural convection heat transfer: when the indoor air temperature begins to drop at night, the first air valve, the second air valve and the third air valve are closed, the fourth air valve, the fifth air valve, the sixth air valve, the seventh air valve, the eighth air valve, the ninth air valve, the tenth air valve and the eleventh air valve are opened, and the axial flow fan is turned off; at this moment, air in the internal channels of the phase-change heat storage units in the solid partition wall is heated to rise naturally, and indoor cold air enters the phase-change heat storage units through the ventilation ports at the bottoms of phase-change heat storage units in the solid partition wall to heat the room through natural convection; and heat release by forced ventilation: when the heat provided for the room through natural convection is limited, the fourth air valve, the fifth air valve, the sixth air valve, the seventh air valve, the second air valve and the third air valve are closed, and the eighth air valve, the ninth air valve, the tenth air valve, the eleventh air valve and the first air valve are opened; the axial flow fan is turned on, and therefore the room is heated by the high-temperature air in the phase-change heat storage units in the solid partition wall through the ventilation ports at the bottoms of the phase-change heat storage units; and cold air at the top of the room is fed into the phase-change heat storage units in the solid partition wall to be heated and forcibly cycled for heating the room.

2. The modular heating system of the solar phase-change energy storage heating ventilation partition wall according to claim 1, wherein the phase-change heat storage modules (6) are hollow cylinders, hollow semi-cylinders or annular hollow cylinders.

3. The modular heating system of the solar phase-change energy storage heating ventilation partition wall according to claim 1, wherein tooth profile structures (8) are arranged on the tops and bottoms of the phase-change heat storage modules (6), and ribs (9) for enhancing heat transfer are arranged on inner walls of the phase-change heat storage modules.

* * * * *